United States Patent [19]

Datta

[11] Patent Number: 4,482,652

[45] Date of Patent: Nov. 13, 1984

[54] MARINE ANTI-FOULING PAINTS

[75] Inventor: Vijay J. Datta, Louisville, Ky.

[73] Assignee: Grow Group, Inc., Louisville, Ky.

[21] Appl. No.: 211,509

[22] Filed: Dec. 1, 1980

[51] Int. Cl.$^3$ .......................... C08K 3/10; C08L 33/00
[52] U.S. Cl. .................................. 523/122; 106/15.05; 524/547; 424/288
[58] Field of Search ............. 260/33.60 A, 29.6 MM, 260/42.21; 106/15.05; 523/122; 524/547; 424/288; 428/541

[56] References Cited

U.S. PATENT DOCUMENTS 3,615,744 10/1971 Yokoo ................................. 106/15
4,157,999 6/1979 Matsuda et al. ................. 106/15.05
4,174,339 11/1979 Matsuda et al. ................... 260/40 R Primary Examiner—Paul Lieberman
Assistant Examiner—Amelia B. Yarbrough
Attorney, Agent, or Firm—Donald L. Cox

[57] ABSTRACT

This invention relates to a marine anti-fouling paint which is particularly useful for coating the exterior hulls of ships. It comprises about 25 to about 80 percent by weight of an organotin olefinically unsaturated co-polymer, about 2.5 to about 40 percent by weight of a basic copper sulfate, about 10 to about 50 percent by weight of a water-insoluble pigment, and optionally up to about 20 percent by weight of a polymeric organic plasticizer.

8 Claims, No Drawings

MARINE ANTI-FOULING PAINTS

BACKGROUND OF INVENTION

This invention relates to a method and composition for preventing the fouling of submerged objects, and more particularly to a method and composition for preventing the fouling of marine structures which for extended periods of time are left at dock or are in environments where water rapidly flows over the submerged surface.

There are two basic types of anti-fouling paints. One type functions via a leaching mechanism and involves the use or inorganic and/or low molecular weight or monomeric organic active anti-fouling agents which at a controlled rate dissolve through the coating matrix into the sea, thereby functioning as a biocide. However, as the materials leach out through the surface of the coating, the coating matrix which remains exhibits an increasingly rough and uneven texture and appearance. In addition, the speed of ships coated with these materials may actually be significantly reduced, particularly in the case of coatings where a major amount of leaching has occurred. Finally, while multiple coats of traditional leaching anti-fouling coatings may be applied to a ship, the total number of coats is limited by the ability of inner layers to leach through the depleted matrix to the surface. An example of the materials which may be used in these leaching anti-fouling paints is basic copper sulfate, as described in U.S. Pat. No. 3,615,744. This material is used in combination with 2-amino-3-chloro-1,4-naphthoquinone.

The second and more recent development in anti-fouling paints is based upon compositions utilizing an organotin polymeric product. These polymeric systems operate by an ablative mechanism, whereby, the entire exposed surface slowly dissolves into sea water, leaving behind a smooth coating surface. Accordingly, even though many layers of ablative materials are applied, each layer as it becomes exposed to sea water effectively functions as an anti-fouling coating. In addition, because of the smoothness of the coating surface, regardless of the amount of ablation which has occurred, the speed of ships coated with these materials is not adversely affected, but actually may be enhanced. An example of the materials of this latter type is set forth in U.S. Pat. No. 4,174,339, which discloses the use of copper thiocyanate an an anti-fouling pigment in an organotin-based polymeric system.

One of the major deficiencies in prior art ablative anti-fouling paints has been their ineffectiveness in calm or stagnant water environments. In other words, most ablative anti-fouling paint compositions work well when there is a fairly rapid flow of water across the surface to be protected. Such a water flow helps to increase the rate of ablation and simultaneously washes away bacterial slime and silt. However, when a water flow is not present, as with piers, along protected harbors, and especially with ships at anchor, little or no surface washing takes place. Moreover, the longer submerged marine surfaces are kept in still water, the greater the marine growth build-up becomes, and even if a period of surface flushing occurs, it often is not of sufficient duration or strength to remove the large incrustations, barnacles, and other fouling materials. This problem is particularly severe because under current economic conditions, large numbers of ships are left unused or are required to sit at anchor often for extended periods of time. Thus, there is a need for ablative anti-fouling paints which work well in calm waters, and particularly on ships at extended anchor.

Accordingly, it is an object of this invention to provide an anti-fouling paint which protects the hulls of ships and other marine structures from fouling. It is another object of this invention to prepare an ablative anti-fouling paint composition which may be used in calm waters and on ships at anchor for long periods of time. These and other objectives are obtained by preparing the composition of this invention.

SUMMARY OF INVENTION

This invention involves a coating composition comprising about 25 to about 80 percent by weight of an organotin copolymer containing about 40 to about 60 percent by weight of at least one organotin monomer of the formula:

$$R_3SnOOCCR'\!=\!CHR''$$

wherein R is the same or different alkyl radical containing up to 8 carbon atoms, an aryl group or an aralkyl group, R' is hydrogen or a methyl group and R" is hydrogen or a —COOSnR$_3$ group. This monomer is copolymerized with about 60 to about 20 percent by weight of another alpha, beta, ethylenically unsaturated monomer. Also added to the composition is about 25 to about 40 percent by weight of a basic copper sulphate, about 10 to about 50 percent by weight of a water-insoluble pigment, and optionally up to about 20 percent by weight of a polymeric organic plasticizer.

DESCRIPTION OF INVENTION

The preparation of certain organotin copolymers useful in this invention is described in U.S. Pat. No. 3,167,473, which is incorporated herein by reference. Similar polymers are described in U.S. Pat. Nos. 4,174,339 and 4,021,392, and are also incorporated by reference. The organotin polymers described in these patents maybe used interchangeably as the organotin polymers of this invention.

The organotin copolymer of the instant invention wherein R is the same or different alkyl radicals containing up to 8 carbon atoms or aryl or aralkyl radical, R' is H or methyl and R" is H, or —COOSnR$_3$. Thus the cation of the salt, R$_3$Sn$^+$, is exemplified by tributyl tin, tripropyl tin, triethyl tin, tribenzyl tin, diethylbutyl tin, diethylamyl tin, diamylmethyl tin, triphenyl tin, tribromophenyl tin, diphenyltolyl tin, tritolyl tin, diethyl phenyl tin, ethyl diphenyl tin, octylidiphynyl tin, and diethyloctyl tin. The preferred cations are those having three identical organic groups attached to the tin atom. The anion of the salt, —OOCCR'=CHR", may be, for example, acrylate, methacrylate, maleate or fumarate. Examples of the salt come from pairing any listed anion with any listed cation.

The copolymer also contains about 60 to about 20, preferably about 50 to about 30 percent by weight of at least one alpha beta ethylenically unsaturated comonomer. Substances suitable as comonomers are acrylic monomers, for example methyl methacrylate, ethyl acrylate, propyl acrylate, amyl acrylate, hexyl acrylate and the corresponding esters of methacrylic acid; acrylonitrile, methacrylonitrile, acrylamide and methacrylamide; and vinyl monomers, for example, vinyl acetate, vinyl butyrate, vinyl chloride, styrene and vinyl pyridine. The copolymer preferably comprises methacrylate salts of the tri-organo tin and methacrylate and/or acrylate esters as the comonomers.

The copolymers of this invention may be prepared by polymerization methods well known in the art, particularly as disclosed in U.S. Pat. Nos. 3,167,473 and 4,174,339. Thus the polymerization usually is accomplished in the presence of a free radical initiator in a solvent at a temperature of about 120° to about 150° C. for a period of 20 minutes to about 10 hours. The free radical initiator used includes, for example, azobisisobutyronitrile, methyl ethyl ketone peroxide or benzoyl peroxide. The solvent used includes, for example, an aromatic hydrocarbon such as xylene or toluene. The copolymers preferably possess a number average molecular weight of about 2,500 to approximately 30,000.

The copolymers of this invention should be added in amounts ranging from about 25 to about 80 percent solids by weight, based on the total coating solids, preferably about 50 to about 65 percent by weight.

The water-insoluble pigment of the instant invention include relatively inert pigments, such as titanium dioxide, iron oxide, silica, talc, china clay, calcium carbonate, barium sulfate and carbon black. This pigment is added at about the 10 to about the 50 percent by weight level based on the total composition, preferably about 20 to about 30 percent by weight.

The basic copper sulfate pigment used in this invention imparts unique anti-fouling properties to the compositions of this invention. This pigment serves two important function in the coatings of this invention. The first function is as a retarder. Many ablative anti-fouling systems require that a separate retarder be added in order to slow or retard the rate of dissolution of the organotin copolymers used. In the coatings of this invention, however, the basic copper sulfate, because of its degree of solubility, can function alone, or in combination with other retarders, as a retarder to slow the dissolution of the organotin copolymers. The second function of the basic copper sulfate is a biocide.

In addition, by the use of basic copper sulfate, it is possible to achieve hitherto unknown levels of anti-fouling protection in still-water environments. Previously, non-polymeric anti-fouling paint compositions in most cases exhibited generally satisfactory static anti-fouling properties. However, polymeric organotin-based materials are basically unsatisfactory in their static anti-fouling properties. By utilizing basic copper sulfate as described in this invention, it is possible to exceed the levels of protection obtained with conventional ablative anti-fouling pigments in static environments. Thus, when other conventional anti-fouling pigments, such as copper thiocyanate, are used in place of basic copper sulfate in ablative systems, a significant increase in the amount of still water fouling is observed.

Basic copper sulfate as used in this invention may be represented by the general formula:

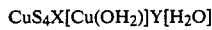

$$CuS_4X[Cu(OH_2)]Y[H_2O]$$

wherein X is a whole number integer of 1-3, and Y is a whole number integer of 0-3. Examples of the basic copper sulfates include mono-, di- and tri-basic copper sulfates (X=1, 2 or 3), and their various hydrates. Tribasic copper sulfate is the preferred basic copper sulfate, with its monohydrate being most preferred.

Basic copper sulfate should be added to the anti-fouling compositions herein at about the 2.5 to about 40 percent by weight level, based on the total anti-fouling solids composition, preferably about 10 to about 20 percent by weight.

The compositions of this invention may also contain coloring pigments, such as phthalocyanine blue and green, extender pigments, as well as thickeners, such as bentonite, fillers, such as aluminum silicated calcium silicate, as well as pigments which are capable of reacting with sea water or water soluble metallic compounds. Examples of such materials include cuprous thiocyanate, copper acetoarsenite, zinc oxide, zinc chromate, copper 8-hydroxyquinolinate, 6-dimethyl dithiocarbamate, copper dimethyl dithiocarbamate, and copper borate, as described in U.S. Pat. No. 3,476,577. These additional pigments may be added to the compositions of this invention in amounts up to about 25 percent by weight.

The composition of the instant invention may be modified with virtually any known polymeric plasticizers compatible with the coatings described herein. Of particular significance are those prepared by copolymerizing polyvinyl chloride and other long chain molecules. Polymeric plasticizers aid in producing films having suitable properties which are not too brittle and which do not crack after application and use. The plasticizers should be added to the instant compositions in amounts ranging up to about 20 percent by weight, preferably up to about 10 percent by weight, based on the total coating composition.

Although not necessary, the compositions of the instant invention may be modified with up to about 50 percent by weight of an organic retarder. A retarder is an organic compound with water solubility of less than five part per million by weight. Examples of such materials include: methyl phenyl silicone fluid (Silicone Fluid DC 550, Dow-Corning Ltd.), chlorinated diphenyl (Aroclor 1254, Monsanto Ltd.), chlorinated parafin wax (Cereclor 48 and 70, I.C.I. Ltd.), vinyl chloride/vinyl isobutyl ether copolymers (Laroflex MP, B.A.S.F. Corp.), naphthalene, diphenyl ether, dichlorodiphenyl trichloroethane, and low molecular weight polybutene (Hyvis 05, B.P. Ltd.).

The compositions of the instant invention may be applied to the hull of a ship, to a pier, or to other submersible marine substrata in one, two or more than two coats. These compositions may be applied by any convenient manner, including brushing, rolling, but spraying is the preferred method.

The invention is illustrated by the following examples, of which all parts and percentages are by weight, unless other indicated:

EXAMPLES

1-A. (Blue coating) An anti-fouling paint composition was prepared by grinding for one-half hour in a pebble mill, 9.5 parts of highflash naphtha, 9.0 parts of Cellosolve acetate, 0.9 parts of Bykumen, an anionic wetting and dispersing agent derived from a high molecular weight unsaturated acid ester, available from Byk-Mallinckrodt, 4.5 parts of Bentone 27, an organic derivative of Smectite available from N. L. Industries, 0.5 parts of methanol, 2.5 parts of MPA 60, a high molecular weight polyethylene wax, available from N. L. Industries, and 0.1 part Byk 0, a defoaming solvent available from Byk-Malllinckrodt. Following the grind, 25.2 parts of a BioMet 300 solution were added to the mixture. BioMet 300 is available from M & T Chemicals, Inc., as a copolymer tributyltin methacrylate and an acrylate ester, at 50% solids by weight high-flash naphtha. It has a weight of 8.475 pounds per gallon, a Brookfield 25° C. viscosity, in the range of about 2500-6000, and contains 10.2 percent tin. It is prepared as set forth in U.S. Pat. No. 3,167,473. Also added were 0.8 parts of Cabosil M-5, a colliodal silicon available from Cabot Industries, 12.0 parts of zinc oxide, 6.0 parts of titanium dioxide, 11.0 parts of tribasic copper sulfate monohydrate, and 0.5 parts of phthalocyanine blue. This mixture was ground for 18 hours in a pebble mill to a #4 Hegman grind. The material was drained and 2.0 parts of high-flash naphtha were used to wash the mill. The material finally was then thinned under agitation with 14.0 parts BioMet 300 solution, 1.0 part of high-flash naphtha, 3.0 parts of Lutanol M-40, a high viscosity polyvinyl methyl ether at 70% solids by weight in toluene, available from BASF, having a specific gravity of 0.9, a flash point of 7° C., and a viscosity at 50% solids in toluene of 40,250 cps at 25° C., and 0.54 parts of Laroflex M-45, available from BASF as a copolymer of vinyl chloride and vinyl isobutyl ether, having a chlorine content of 44% by weight, a density of 1.2 grams/milliliter, and a vicat softening point of 48°-52° C.

1-B. (Green Coating) In Example 1-A phthalocyananine blue was replaced on a weight basis with phthalocyananine green.

1-C. (White Coating) In Example 1-A phthalocyananine blue was replaced on a weight basis with titanium dioxide.

2-A,B. Examples 1-A and 1-B were prepared with the tribasic copper sulfate replaced on a weight basis with two-thirds zinc oxide and one-third titanium dioxide.

3. Example 3 is a commercially available organotin formulation, SPC, available from the International Paint Company, Inc. It is based upon an organotin co-polymer and has a bis(tributyl tin)oxide content of 11.7 percent and a copper thiocyanate content of 17.2 percent, the remainder being inert ingredients.

4. Example 1 was prepared using copper thiocyanate in place of tribasic copper sulfate.

5. Example 1 was prepared except that all of the Laroflex M-45 and 9.2 parts of BioMet 300 solution were removed and replaced on a weight basis with two-thirds zinc oxide and one-third titanium dioxide.

6-A,B. Examples 1-B and 1-C were prepared except that the Laroflex M-45 was removed and replaced on a weight basis with two-thirds zinc oxide and one-third titanium dioxide.

7. Both green (7-A) and white (7-B) conventional cuprous oxide containing non-ablative coatings were prepared containing 39 percent of cuprous oxide, 11 percent zinc oxide, 9.0 percent W. G. gum rosin, 2.4 percent polyvinyl chloride resin (VYHH, Union Carbide), and the remainder being solvents and other additives.

8. Example 1-B was prepared except that the Laroflex M-45 and the copper sulfate were replaced on a weight basis with two-thirds zinc oxide and one-third titanium dioxide.

9. Example 1-B was prepared except that the Laroflex M-45 was removed and replaced on a weight basis with two-thirds zinc oxide and one-third titanium dioxide.

TEST SYSTEMS

Three four mil coats of certain of the above-identified examples were applied over 6"×16" fourteen-gauge steel panels, which had initially been sand blasted and painted with a suitable anti-corrosive coating system. They were then exposed to sea water at Miami Marine Research, Inc. in Miami, Fla., for 15 months, with the following results:

|  | Fouling | Rating |
| --- | --- | --- |
| (a) Example 1-A | Spores 60% | 100% |
| (b) Example 2 | Algae Green 3% Spores 40% | 92% |
| (c) Example 3 | Barnacles 6% Algae Green 3% Spores 75% | 87% |

Similar test systems were prepared and applied over 6"×16" fourteen-gauge steel panels which had initially been sandblasted and painted with a suitable anti-corrosive coating system. They were then exposed to sea water in Miami for four months, with the following results:

|  | Fouling | Rating |
| --- | --- | --- |
| (d) Example 1 | Spores 35% | 100% |
| (e) Example 4 | Algae Red 3% Spores 75% | 92% |

Three four mil coats of certain of the above-identified examples were applied over anti-corrosive coated 6"×16" fourteen-gauge steel panels and exposed to sea water in Miami for eleven months, with the following results:

|  | Fouling | Rating |
| --- | --- | --- |
| (f) Example 5 | Spores 60% | 100% |
| (g) Example 3 | Algae Green 2% Spores 90% | 93% |

Three four mil coats of certain of the above examples were applied (first green, then white, followed by another green coat) over anti-corrosive coated 6"×16" fourteen-gauge steel panels and exposed to sea water in Miami for ten months, with the following results:

|  | Fouling | Rating |
| --- | --- | --- |
| (h) Example 6 | Spores 30% | 100% |
| (i) Example 7 | Encrusting Byrozoans 1% Algae Red 1% Spores 95% | 93% |

Two four mil coats of certain of the above examples were applied over anti-corrosive coated 6"×16" fourteen-gauge steel panels using the procedures set forth below, and were exposed to sea water in Miami for eight months.

|  | Fouling | Rating |
| --- | --- | --- |
| (j) First coat (Example 2-B); and second coat (Example 8) | Algae Green 3% Spores 35% | 92% |
| (k) First coat (Example 1-A); and second coat (Example 9) | Spores 5% | 100% |

As can be seen from the above, significant improvements in static anti-fouling properties are exhibited when the unique compositions of this invention are used in coating formulations.

What is claimed is:

1. A coating composition having an improved rate of ablation and improved still water anti-fouling properties comprising:
   (a) a film-forming copolymer containing about 25 to about 80 percent by weight based on the total coating composition of an organotin monomer having the general formula $R_3SnOOCCR'=CHR''$, wherein R is the same or different alkyl radical containing up to 8 carbon atoms, an aryl or an aralkyl group; R' is hydrogen or a methyl group and R" is hydrogen or a $-COOSnR_3$ group, the balance of the copolymer based on alpha beta ethylenically unsaturated monomers copolymerizable therewith;
   (b) about 2.5 to about 40 percent by weight on the same basis of a basic copper sulfate; and
   (c) about 10 to about 50 percent by weight on the same basis of a water-insoluble pigment or filler.

2. The composition of claim 1 in admixture with up to about 20% by weight of a polymeric organic, polyvinylchloride copolymer, plasticizer.

3. The composition of claim 1, wherein the basic copper sulfate is tribasic copper sulfate.

4. The composition of claim 3, wherein the tribasic copper sulfate is a monohydrate.

5. The composition of claim 3, wherein the tribasic copper sulfate is present at about the 10 to about 20 percent by weight level based on the total coating composition weight.

6. The composition of claim 1, wherein the organotin polymer is present at about the 50 percent to about 70 percent by weight level based on the total coating composition weight, the basic copper sulfate is present at about the 10 to about 20 percent by weight level, and the water-insoluble pigment is present at about the 20 percent to about 30 percent by weight level.

7. The composition of claim 6 in admixture with up to about 10 percent by weight of a polymeric plasticizer.

8. The composition of claim 6 wherein the basic copper sulfate is tribasic copper sulfate.

* * * * *